(12) United States Patent
Brinkman

(10) Patent No.: US 8,185,254 B2
(45) Date of Patent: May 22, 2012

(54) METHOD AND SYSTEM FOR UPDATING NAVIGATION INFORMATION

(75) Inventor: Ron Brinkman, Phoenix, AZ (US)

(73) Assignee: Honeywell International Inc., Morristown, NJ (US)

( * ) Notice: Subject to any disclaimer, the term of this patent is extended or adjusted under 35 U.S.C. 154(b) by 1340 days.

(21) Appl. No.: 11/779,530

(22) Filed: Jul. 18, 2007

(65) Prior Publication Data

US 2009/0024312 A1    Jan. 22, 2009

(51) Int. Cl.
*G01C 21/00* (2006.01)

(52) U.S. Cl. ......... 701/3; 701/29.1; 701/29.4; 701/32.1; 455/66.1; 370/238

(58) Field of Classification Search .............. 701/3, 200, 701/29.1, 29.4, 32.1; 370/238; 455/66.1
See application file for complete search history.

(56) References Cited

U.S. PATENT DOCUMENTS

| | | | | |
|---|---|---|---|---|
| 5,270,931 | A * | 12/1993 | Appleford | 701/3 |
| 6,148,179 | A * | 11/2000 | Wright et al. | 455/66.1 |
| 6,160,998 | A * | 12/2000 | Wright et al. | 455/66.1 |
| 6,163,681 | A * | 12/2000 | Wright et al. | 455/66.1 |
| 6,167,238 | A * | 12/2000 | Wright | 455/66.1 |
| 6,167,239 | A * | 12/2000 | Wright et al. | 455/66.1 |
| 6,173,159 | B1 | 1/2001 | Wright et al. | |
| 6,184,816 | B1 * | 2/2001 | Zheng et al. | 342/26 R |
| 6,289,276 | B1 * | 9/2001 | Ahrens et al. | 701/533 |
| 6,438,468 | B1 * | 8/2002 | Muxlow et al. | 701/3 |
| 6,563,452 | B1 * | 5/2003 | Zheng et al. | 342/26 R |
| 6,745,123 | B1 * | 6/2004 | Petzold et al. | 701/451 |
| 6,823,255 | B2 * | 11/2004 | Ahrens et al. | 701/533 |
| 6,862,500 | B2 * | 3/2005 | Tzamaloukas | 701/1 |
| 6,922,703 | B1 * | 7/2005 | Snyder et al. | 345/633 |
| 6,925,378 | B2 | 8/2005 | Tzamaloukas | |
| 7,076,365 | B2 | 7/2006 | Tzamaloukas | |
| 7,188,026 | B2 | 3/2007 | Tzamaloukas | |
| 7,257,469 | B1 * | 8/2007 | Pemble | 701/3 |
| 7,729,263 | B2 * | 6/2010 | True et al. | 370/238 |
| 2009/0024312 | A1 * | 1/2009 | Brinkman | 701/200 |

* cited by examiner

*Primary Examiner* — Thomas Black
*Assistant Examiner* — Wae Louie
(74) *Attorney, Agent, or Firm* — Ingrassia Fisher & Lorenz, P.C.

(57) ABSTRACT

A method and system for updating navigation information are disclosed. The method includes the steps of connecting to a navigation information update system, determining if at least one navigation information update is available from the navigation information update system, if the at least one navigation information update is available from the navigation information update system, determining if an intended recipient of the at least one navigation information update is available or unavailable for an update. If the intended recipient of the at least one navigation information update is determined to be unavailable for an update, the method downloads the at least one navigation information update to a navigation information cache onboard the intended recipient or a processing unit not onboard the intended recipient, and if the intended recipient of the at least one navigation information update is determined to be available for the update, the method downloads the at least one navigation information update to the navigation information cache onboard the intended recipient, and installs the at least one navigation information update in a navigation information system onboard the intended recipient.

17 Claims, 2 Drawing Sheets

METHOD AND SYSTEM FOR UPDATING NAVIGATION INFORMATION

FIELD OF THE INVENTION

The invention is related to the navigation field, and more particularly, but not exclusively, to a method and system for updating navigation information.

BACKGROUND OF THE INVENTION

The Integrated Navigation (INAV™) system is an onboard, interactive navigation system that enables the simultaneous display in aircraft of traffic, terrain, airspace, airways, airports and navigation aids. The Enhanced Ground Proximity Warning System (EGPWS) is another onboard navigation system that uses certain aircraft inputs, such as position, air speed and glide slope, along with navigation database information such as terrain, obstacle and airport information, to predict potential conflicts between the aircraft's flight path and terrain or obstacles involved. The Integrated Primary Flight Display (IPFD) is a Synthetic Vision System (SVS) that is another onboard navigation system that provides a Visual Flight Rule (VFR) environment regardless of the time of day or weather conditions. The Runway Awareness and Advisory System (RAAS) is another onboard navigation system that provides improved situational awareness to help lower the probability of runway incursions by providing timely aural advisories to flight crews during taxi, takeoff, final approach, landing and rollout. The navigation information for such systems is maintained in an onboard database and updated on a regular basis. For example, the onboard INAV™ service information database is required to be updated bi-weekly.

A significant problem with the existing onboard navigation information updating techniques is that they are time-consuming manual processes that require the aircraft to be scheduled out-of-service to perform. Consequently, the owners/operators experience down-time, challenges with respect to coordinating aircraft and maintenance personnel schedules, maintenance personnel costs, delayed incorporation of required updates, and decreased revenue as a result. Therefore, a pressing need exists for a navigation information updating technique that can reduce down-time and related costs, increase the timeliness of updates, and resolve the above-described problems and other related problems.

SUMMARY OF THE INVENTION

A method for updating navigation information is provided, in accordance with at least a first example embodiment of the present invention. The method includes the steps of connecting to a navigation information update system, determining if at least one navigation information update is available from the navigation information update system, if the at least one navigation information update is available from the navigation information update system, determining if an intended recipient of the at least one navigation information update is available or unavailable for an update. If the intended recipient of the at least one navigation information update is determined to be unavailable for an update, the method downloads the at least one navigation information update to a navigation information cache onboard the intended recipient or a processing unit not onboard the intended recipient, and if the intended recipient of the at least one navigation information update is determined to be available for the update, the method downloads the at least one navigation information update to the navigation information cache onboard the intended recipient, and installs the at least one navigation information update in a navigation information system onboard the intended recipient.

A method for automatically updating navigation information is provided, in accordance with at least a second example embodiment of the present invention. The method includes the steps of subscribing for automated navigation database maintenance service, polling to determine if at least one navigation information update is available for an intended recipient, responsive to the polling step, if the at least one navigation information update is determined to be available for the intended recipient, downloading the at least one navigation information update from a navigation database information update system, and caching the at least one navigation information update.

A system for updating navigation information is provided, in accordance with at least a third example embodiment of the present invention. The system includes a navigation database information update system, the navigation database information update system including navigation information, a proxy navigation database information update system coupled to the navigation database information update system, and a navigation information database onboard a craft. The proxy navigation database information update system is configured to connect to the navigation database information update system, determine if at least one navigation information update is available for the craft, if the at least one navigation information update is available for the craft, determine if the craft is in service or out of service. If the craft is determined to be out of service, the navigation database information update system is configured to download the at least one navigation information update to the navigation information database onboard the craft or to the proxy navigation database information update system, and if the craft is determined to be in service, the navigation database information update system is configured to download the at least one navigation information update to a proxy navigation database information update system cache.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF PREFERRED EMBODIMENT(S)

Figure 1:
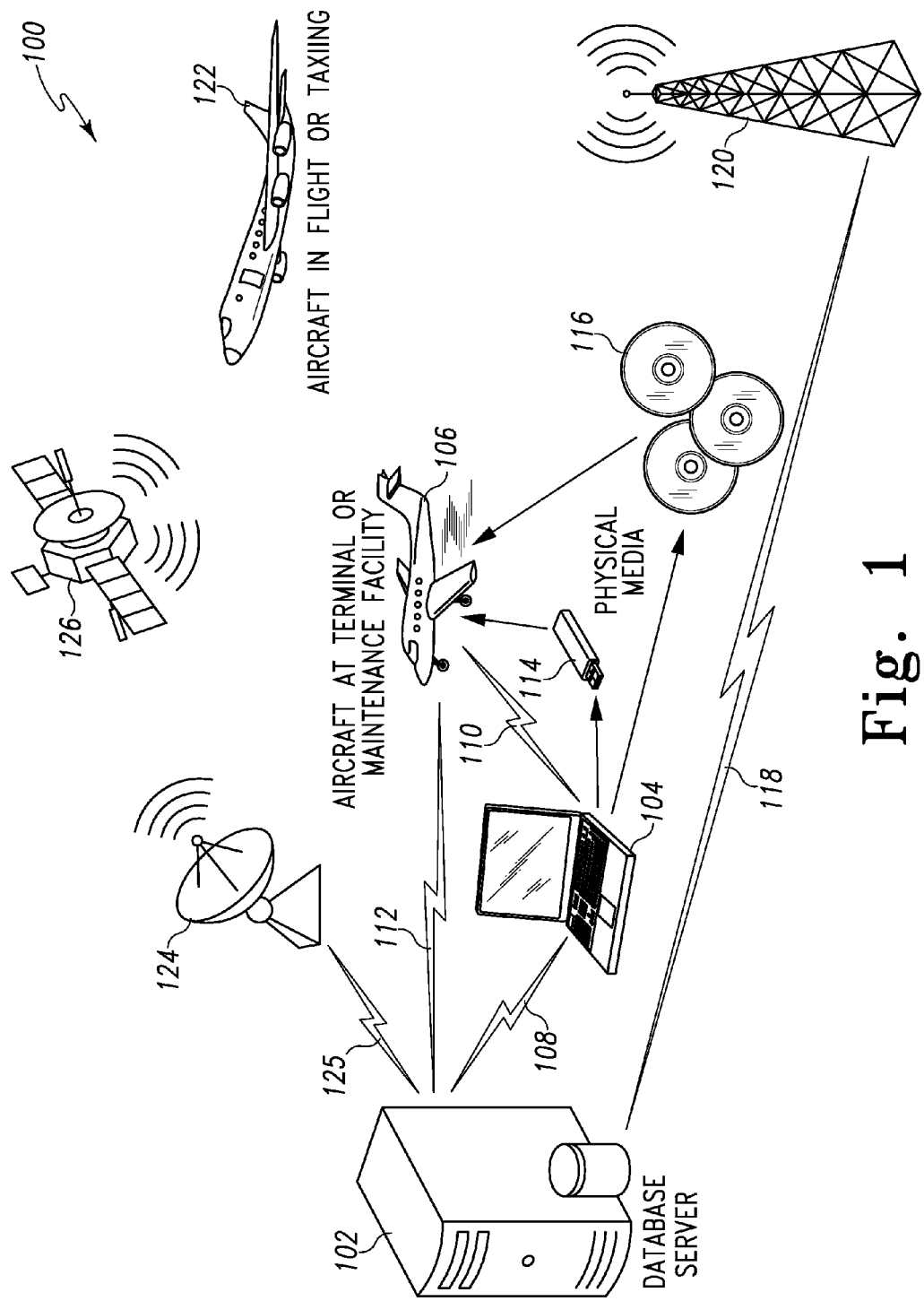
FIG. 1 depicts a system for updating navigation information, which can be used to implement one or more example embodiments of the present invention.

With reference now to the figures, FIG. 1 depicts a system 100 for updating navigation information, which can be used to implement one or more example embodiments of the present invention. For at least one example embodiment, system 100 includes a navigation database information update system 102. For example, the navigation database information update system 102 can be a server or similar device including navigation database information, such as an INAV™ database, IPFD database, a RAAS database or an EGPWS database, just to name a few. As such, it should be understood that the present invention is not intended to be limited to a specific navigation system, service, database or server, and can include within its scope any suitable processing unit associated with a database or similar functionality, which is capable of storing, retrieving and updating navigation database information, and can be accessed for navigation database information downloads by authorized processing systems and/or personnel. For example, an authorized system or user may be a subscriber that can access the navigation database information stored in navigation database information update system 102 via the Internet or suitable other type of data communications network. Furthermore, it should be understood that the present invention is not intended to be limited to a specific vehicle type or location and is equally applicable to updates of databases or other suitable storage media that require, for example, field updates of navigation information such as, for instance, trains, subsurface craft, motor vehicles, aircraft, spacecraft, autonomous subsurface craft, land craft and aircraft (UAVs), or navigation information contained in systems at remote facilities that control the aforementioned craft and vehicles.

Also, for at least one example embodiment, system 100 includes a proxy navigation database information update system 104. For example, proxy navigation database information update system 104 can be a portable processing unit, such as a laptop Personal Computer (PC), maintenance PC, or similar device that can be transported to a location at or nearby an aircraft (or other type of craft or vehicle involved). In any event, proxy navigation database information update system 104 is configured to perform the primary functions performed by the navigation database information update system 102, such as storing, retrieving and updating navigation database information. As such, proxy navigation database information update system 104 and navigation database information update system 102 can be interconnected for data communications and transfer via a wireless or wired connection 108. For example, navigation database information stored in the navigation database information update system 102 can be electronically downloaded to, and stored in, proxy navigation database information update system 104 via wireless or wired connection 108. For some example embodiments, at this point, the proxy navigation database information update system 104 may be disconnected from the navigation database information update system 102, and can act autonomously to perform the pertinent functions of the navigation database information update system 102 remotely at or nearby an aircraft's (or other craft's or vehicle's) location.

For at least one example embodiment, after the functions described directly above are performed, the proxy navigation database information update system 104 may be interconnected via a wireless or wired connection 110 for autonomous data communications and transfer of at least one navigation database information update with a navigation information database cache 106 located onboard an aircraft (or other craft or vehicle). Also, proxy navigation database information update system 104 is configured to generate physical media that can be stored on a removable storage device 114 and/or 116, which includes pertinent navigation database information for use in the onboard navigation information database cache 106. For example, proxy navigation database information update system 104 can generate and store pertinent navigation database information on such a removable storage media as a USB thumb drive 114 or CD ROM 116, and the thumb drive 114 or CD ROM 116 can be connected directly to a processing unit associated with the navigation information database cache 106 onboard the aircraft involved. The processing unit can then be used to download the pertinent navigation database information generated by the proxy navigation database information update system 104 to the onboard navigation information database cache 106. However, it should be understood that the present invention is not intended to be limited to a particular type of medium used to store and download the navigation database information to the onboard navigation information database cache 106, and can include within its scope any suitable type of device that can store navigation database information generated, for example, by a proxy server, digital processor, or similar device, be physically connected to the processing unit associated with a navigation information database onboard an aircraft, and can download the navigation database information to the navigation information database.

For at least one example embodiment, the navigation database information update system 102 is interconnected with a broadcast transmitter unit 120 via a wireless or wired connection 118. The broadcast transmitter unit 120 is capable of transmitting navigation database information at a frequency and with a format typically used for communications with an aircraft on the ground (aircraft associated with onboard database 106) and/or in flight 122. The navigation database information update system 102 is also interconnected with a satellite communications earth-based uplink transmitter unit 124 via a wireless or wired connection 125. Thus, the navigation database information update system 102 can convey navigation database information on an uplink to a communications satellite 126, which in turn, transmits the navigation database information on a downlink to the associated navigation information database cache 106 onboard the aircraft shown or aircraft 122.

Figure 2:
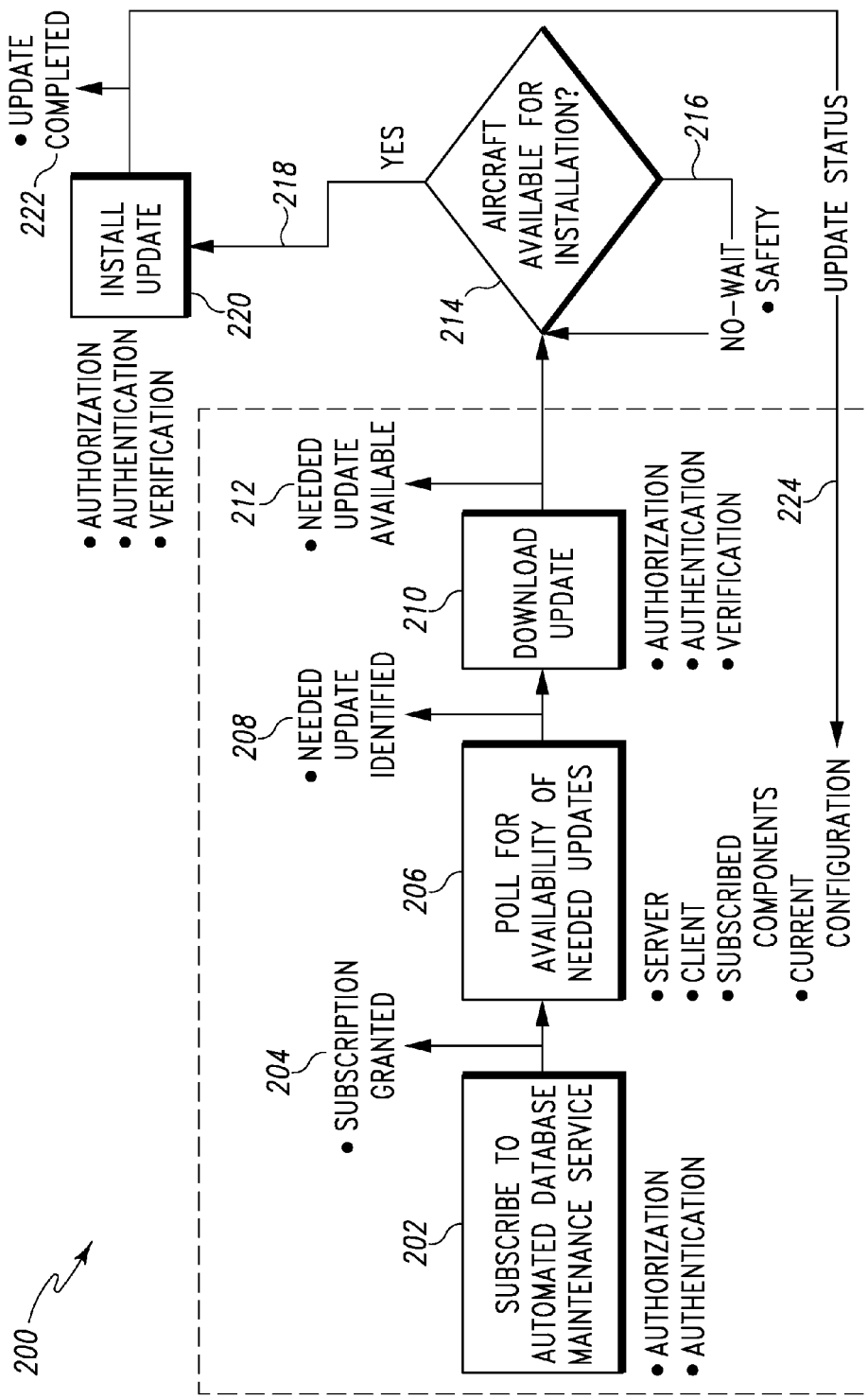
FIG. 2 is a process diagram depicting a method for updating navigation information, which can be used to implement one or more example embodiments of the present invention.

FIG. 2 is a process diagram depicting a method 200 for updating navigation database information, which can be used to implement one or more example embodiments of the present invention. For at least one example embodiment, the steps of method 200 can be implemented by the components of the exemplary system 100 depicted in FIG. 1.

Referring now to FIGS. 1 and 2, for at least one example embodiment, method 200 begins with an entity requesting a subscription, for example, for automated navigation information database maintenance service (step 202). For example, an owner/operator may access the navigation database information update system 102 (e.g., via the Internet, a proprietary data communications network, LAN, WAN, etc.), and request a subscription for the particular navigation information database maintenance service involved. Alternatively, in a less preferable mode, the potential subscriber may request a subscription off-line (e.g., mail-in subscription request, telephone subscription request, etc.), or via an on-line network connection with a different server than the navigation database information update system 102. In other words, an initial subscription request may be received and processed by any suitable subscription processing technique and/or device that can authenticate the identity of the subscriber, and authorize the subscription for that subscriber if the authentication procedure is satisfied. An automated subscription process is the preferable technique, but a suitable non-automated subscription process may also be used.

If a subscription request from an entity is suitably authenticated and authorized, the subscription for that entity can be granted (step 204). For example, the navigation database information update system 102 (or a similar type of processing unit) may automatically authenticate, authorize and grant a subscription in response to a valid request from the entity (client, subscriber, operator, etc.) involved. As such, for at least one example embodiment, the grant of a subscription at step 204 enables the navigation database information update system 102 to perform the subsequent steps of method 200 for the subscriber/client involved. In that regard, either prior to or after a subscription is granted, the client can connect (e.g., via the Internet, wireless or wired connection, etc.) a suitable automated system (e.g., proxy navigation database information update system 104 or onboard navigation information database 106) to the navigation database information update system 102, so that the subsequent steps of method 200 can be automatically or semi-automatically performed.

Next, for at least one example embodiment, both the navigation database information update system 102 and the client's automated system (e.g., proxy navigation database information update system 104 or onboard navigation information database 106) poll each other to determine if the navigation database information update system 102 has one or more navigation database information updates available, and if so, whether or not the available update(s) is/are needed by the onboard navigation database information database(s) of the client involved (step 206). For example, the determination about whether or not the client needs an available navigation database information update can be influenced by the specific navigation database information components for which the client has subscribed, and the current configuration of the onboard navigation information database(s) of the client involved (among other things). If the polling process determines that one or more navigation database information database updates are needed for the client, then the navigation database information update system 102 identifies the one or more updates for the client's automated system (step 208). Note that, in the exemplary system 100 shown, the client's automated system can be the proxy navigation database information update system 104 or the onboard navigation information database 106.

For at least one example embodiment, if a navigation database information update is identified as available for a client, the update download process can be automatically initiated (step 210). For example, before initiating the update download process, the navigation database information update system 102 can perform known authorization, authentication and verification processes to ensure that the client is a valid subscriber and authorized to receive the update involved. If the client is a valid subscriber and authorized to receive the needed update, then the navigation database information update system 102 queues the update for download and thus makes it available for transfer to the client's automated system (step 212).

The navigation database information update system 102 may accomplish the navigation database information update download process in at least one of two ways. For example, if the client's onboard navigation information database 106 is connected to the navigation database information update system 102 via the Internet and a wireless or wired connection (e.g., 112), the application software of the client's onboard navigation information database 106 can autonomously perform the entire update download process. Primarily for safety purposes, the onboard application software can allow the update information to be downloaded and cached onboard the aircraft while the aircraft is either in or out of service. Then, the onboard application software can determine whether or not the aircraft is available for installation of the update in the onboard database (step 214). For example, the onboard application software can determine if the aircraft is not in service (e.g., parked at the gate or the maintenance facility). If the onboard application software determines that the aircraft is not available for installation of the update (e.g., the aircraft is in service), then the process is placed in a wait state (step 216). However, if the onboard application software determines that the aircraft is available for installation of the update in the onboard navigation information database 106 (step 218), then the application software performs the remainder of the update installation procedure (step 220). However, prior to installing the update, the application software can perform known authorization, authentication and verification procedures to ensure that the installation is valid. Once the update installation process is complete, at step 222, the flow can return to step 206 (step 224) where the updated configuration of the aircraft navigation information database is recorded for future reference.

Returning to the download process, if the navigation database information update system 102 determines that the download of the navigation database information update to the client's automated system (e.g., proxy navigation database information update system 104 or onboard navigation information database 106) is interrupted for any reason, then the navigation database information update system 102 and the client's automated system can resume polling each other. The download process can be resumed, and the download/polling cycles can be continued until the entire download of the update information is complete.

For at least a second example embodiment, if the client's onboard navigation information database 106 is not connected to the navigation database information update system 102 via the Internet and/or a wireless or wired connection (e.g., 112), the navigation database information update system 102 can download the navigation database information update to the proxy navigation database information update system 104 (or, for example, a suitable maintenance PC) via connection 108. After the download process is complete, the proxy navigation database information update system 104 (or maintenance PC) can autonomously perform the installation of the update information in the onboard navigation information database 106 when the aircraft is available for the installation (e.g., not in service). For example, the proxy navigation database information update system 104 (or maintenance PC) can sense when it is connected (e.g., via a wireless or wired connection 110) to the onboard navigation information database 106, and automatically complete the database update.

Also, if the client's onboard navigation information database 106 is not connected to the navigation database information update system 102 via the Internet and/or a wireless or wired connection (or, for example, the operator desires not to use such connectivity), the above-described steps 202 through 212 can be performed using a two-step process. For example, the proxy navigation database information update system 104 can initially serve as the subscribing client (e.g., for a single aircraft or fleet of aircraft), and receive and cache the needed database updates. After the updates are cached, the proxy navigation database information update system 104 can be connected via a wireless or wired connection 110 to the aircraft's data communications infrastructure. At that time, the proxy navigation database information update system 104 can perform the pertinent functions of the navigation database information update system 102, the aircraft's onboard navigation database software can perform the primary functions of the client, and the above-described automated process can be resumed.

For at least a third example embodiment, the installation of the navigation database information in the craft's onboard navigation information database 106 can be performed using removable storage media, such as, for example, a USB thumb drive 114, CD ROM 116, or compact flash memory device (to name a few). For example, as described above, the proxy navigation database information update system 104 can cache the needed database update information. The proxy navigation database information update system 104 can then perform the task of preparing the physical media (e.g., store the suitably formatted update information on the removable storage device involved). The storage device can then be connected to the onboard processing unit associated with the onboard navigation information database 106, and the update information can be downloaded from the removable storage device to the onboard navigation information database 106 and installed.

Using the removable storage media in one example approach, the media (including navigation database information update) can be placed in an aircraft and used directly by the software applications of the onboard system. For example, the new media can be exchanged for the older media, in order to provide the updated data to the software application(s) involved. The media can remain on the aircraft during the aircraft's operations.

Using the removable storage media in a second example approach, when the media is placed in an aircraft, the onboard software application can recognize the presence of the media, and initiate the automated process of extracting the database update information from the media and storing it in the associated onboard storage. When the update process is successfully concluded, the media can be removed, because the update is now maintained in the aircraft internal storage.

Notably, in one or more preferred embodiments, only the portions of the navigation database information update applicable to a specific aircraft, and in particular, only the portions of that navigation database information that have changed, are distributed to that aircraft's database. This approach eliminates the transfer of information not needed by that aircraft type, for options not selected by the aircraft operator, and for information that has not changed since the previous update. The advantageous results of this approach is that there are smaller transfers of data, shorter transfer and update times, reduced chance of an error or interruption during transfer, and reduced file transfer fees (e.g., in those cases where network access charges are applied on a per-file or per-megabyte basis).

Notably, in one or more preferred embodiments, the present invention provides flexibility to deviate from a rigid update interval (such as a bi-weekly cycle), and most importantly permits the timely/immediate distribution of urgent/emergency updates of important navigation information database changes.

It is important to note that while the present invention has been described in the context of a fully functioning system for updating navigation database information, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMs, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular system for updating navigation database information.

The description of the present invention has been presented for purposes of illustration and description, and is not intended to be exhaustive or limited to the invention in the form disclosed. Many modifications and variations will be apparent to those of ordinary skill in the art. These embodiments were chosen and described in order to best explain the principles of the invention, the practical application, and to enable others of ordinary skill in the art to understand the invention for various embodiments with various modifications as are suited to the particular use contemplated.

What is claimed is:

1. A method for updating navigation information, comprising the steps of:
    connecting to a navigation information update system;
    determining if at least one navigation information update is available from the navigation information update system;
    if the at least one navigation information update is available from the navigation information update system, determining if an intended recipient of the at least one navigation information update is available or unavailable for an update;
    downloading, when the intended recipient of the at least one navigation information update is determined to be in service, the at least one navigation information update to a navigation information cache onboard the intended recipient, wherein when the intended recipient of the at least one navigation information update is determined to be out of service the one navigation information update is automatically installed from the onboard cache; and
    downloading, when the intended recipient of the at least one navigation information update is determined to be available for the update, the at least one navigation information update to the navigation information cache onboard the intended recipient, and installing the at least one navigation information update in a navigation information system onboard the intended recipient.

2. The method of claim 1, wherein the intended recipient comprises at least one of a manned, remotely controlled or autonomous aircraft, motor vehicle, train, subsurface craft, land craft, or spacecraft, or a system at a remote facility that controls such a craft or vehicle.

3. The method of claim 1, wherein the downloading, when the intended recipient of the at least one navigation information update is determined to be in service, the at least one navigation information update to a navigation information cache onboard the intended recipient, further comprises:
    downloading the at least one navigation information update to a processing unit not onboard the intended recipient;
    connecting the processing unit not onboard the intended recipient with the navigation information cache onboard the intended recipient; and
    installing the at least one navigation information update in a database associated with the navigation system onboard the intended recipient.

4. The method of claim 3, wherein the step of connecting the processing unit not onboard the intended recipient with the navigation information database onboard the intended recipient comprises:
    storing the at least one navigation information update in a removable storage device;
    connecting the removable storage device with the navigation database onboard the intended recipient; and
    installing the at least one navigation information update in the navigation information database onboard the intended recipient, if the intended recipient is determined to be available for the update.

5. The method of claim 1, wherein the downloading, when the intended recipient of the at least one navigation information update is determined to be available for the update, the at least one navigation information update to the navigation information cache onboard the intended recipient, and installing the at least one navigation information update in a navigation information system onboard the intended recipient, further comprises:

downloading the at least one navigation information update to a processing unit not onboard the intended recipient;

determining if the intended recipient is in service or out of service; and if the intended recipient is out of service, connecting the processing unit not onboard the intended recipient with a navigation information database onboard the intended recipient, and installing the at least one navigation information update in the navigation information database onboard the intended recipient.

6. The method of claim 1, wherein the downloading, when the intended recipient of the at least one navigation information update is determined to be available for the update, the at least one navigation information update to the navigation information cache onboard the intended recipient, and installing the at least one navigation information update in a navigation information system onboard the intended recipient, further comprises:

determining if the intended recipient of the at least one navigation information update is a craft determined to be in service; and if the intended recipient of the at least one navigation information update is determined to be in service, not installing the at least one navigation service information update in the navigation information database onboard the intended recipient craft.

7. The method of claim 1, further comprising the steps of:

prior to determining if at least one navigation information update is available from the navigation information update system, subscribing for automated navigation database maintenance service.

8. The method of claim 1, wherein the connecting step further comprises a step of connecting to the navigation information update system via the Internet.

9. The method of claim 1, wherein the navigation information update system comprises a database server unit.

10. The method of claim 1, wherein the processing unit not onboard the intended recipient comprises at least one of a proxy navigation information update system, a proxy server unit, and a PC.

11. A method for automatically updating navigation information, comprising the steps of:

subscribing for automated navigation database maintenance service;

polling to determine if at least one navigation information update is available for an intended recipient;

responsive to the polling step, if the at least one navigation information update is determined to in service, downloading the at least one navigation information update from a navigation database information update system, and caching the at least one navigation information update in an onboard cache;

determining if the intended recipient is out of service; and automatically installing the at least one navigation information update in the onboard navigation information database when the intended receipt is determined to be out of service.

12. The method of claim 11, wherein the polling step comprises the steps of:

the navigation information update system polling a client's automated navigation system; and the client's automated navigation system polling the navigation information update system.

13. The method of claim 11, wherein the polling step comprises the steps of:

the navigation information update system polling a proxy navigation information update system; and the proxy navigation information update system polling the navigation database information update system.

14. A system for updating navigation information, comprising:

a navigation database information update system, the navigation database information update system including navigation information;

a proxy navigation database information update system coupled to the navigation database information update system; and a navigation information database onboard a craft, wherein the proxy navigation database information update system is configured to:

connect to the navigation database information update system;

determine if at least one navigation information update is available for the craft;

when the at least one navigation information update is available for the craft, determine if the craft is in service or out of service;

when the craft is determined to be out of service, the navigation database information update system is configured to:

download the at least one navigation information update to the navigation information database onboard the craft; and when the craft is determined to be in service, the navigation database information update system is configured to:

download the at least one navigation information update to cache onboard the craft;

automatically install the at least one navigation information when the craft is determined to be out of service.

15. The system of claim 14, wherein if the craft is determined to be in service, the navigation database information update system is further configured to:

download the at least one navigation information update to the proxy navigation database information update system; and the proxy navigation database information update system is further configured to:

determine if the craft is out of service; and if the craft is determined to be out of service, connect with the navigation information database onboard the craft, and install the at least one navigation information update in the navigation information database onboard the craft.

16. The system of claim 14, wherein if the craft is determined to be in service, the navigation database information update system is further configured to:

download the at least one navigation information update to the navigation information database cache onboard the craft; and the navigation information database onboard the craft is further configured to:
determine if the craft is out of service; and
if the craft is determined to be out of service, install the at least one navigation information update.

17. The system of claim 14, wherein the proxy navigation database information update system is further configured to: subscribe for automated navigation database maintenance service, prior to determining if the at least one navigation information update is available from the navigation database information.

* * * * *